US010897542B2

(12) United States Patent
Keller et al.

(10) Patent No.: US 10,897,542 B2
(45) Date of Patent: Jan. 19, 2021

(54) NETWORK-ENABLED DOOR STATION EXTENDER

(71) Applicant: Bird Home Automation GmbH, Berlin (DE)

(72) Inventors: Sascha Keller, Berlin (DE); Bernd Müller, Kleinmachnow (DE)

(73) Assignee: BIRD HOME AUTOMATION GMBH

( * ) Notice: Subject to any disclaimer, the term of this patent is extended or adjusted under 35 U.S.C. 154(b) by 0 days.

(21) Appl. No.: 16/361,719

(22) Filed: Mar. 22, 2019

(65) Prior Publication Data
US 2019/0297191 A1    Sep. 26, 2019

Related U.S. Application Data

(60) Provisional application No. 62/646,471, filed on Mar. 22, 2018.

(30) Foreign Application Priority Data

Apr. 27, 2018  (EP) .................................... 18169939

(51) Int. Cl.
*H04M 7/00*  (2006.01)
*H04W 4/80*  (2018.01)
(Continued)

(52) U.S. Cl.
CPC ...... *H04M 7/0024* (2013.01); *H04L 12/2836* (2013.01); *H04M 1/0291* (2013.01);
(Continued)

(58) Field of Classification Search
None
See application file for complete search history.

(56) References Cited

U.S. PATENT DOCUMENTS

2003/0177427 A1* 9/2003 Fattouh ................. G06F 30/367
  714/741
2004/0071148 A1* 4/2004 Ozaki ................... H04L 69/169
  370/401
(Continued)

FOREIGN PATENT DOCUMENTS

DE   102010014471 A1   10/2011
EP       1587293 A1    10/2005
(Continued)

OTHER PUBLICATIONS

International Search Report in PCT/EP2019/057162 (dated May 22, 2019).

*Primary Examiner* — Rebecca E Song
(74) *Attorney, Agent, or Firm* — Brad Bertoglio; Intelink Law Group, P.C.

(57) ABSTRACT

Aspects of the present invention relates to a communications module for a door station, comprising a connection interface for communications with at least one door station in accordance with a door station communication protocol, a network interface for communications via a network in accordance with a network communication protocol, and a controller coupling the network interface and the connection interface, wherein the controller is configured to set or change the door station communications protocol of the connection interface. Further aspects of the present invention relate to a method of operating a communications module of a door station.

19 Claims, 6 Drawing Sheets

(51) Int. Cl.
*H04M 1/02* (2006.01)
*H04M 11/02* (2006.01)
*H04M 19/00* (2006.01)
*H04N 7/18* (2006.01)
*H04L 12/28* (2006.01)

(52) U.S. Cl.
CPC ....... *H04M 11/025* (2013.01); *H04M 19/001* (2013.01); *H04N 7/186* (2013.01); *H04W 4/80* (2018.02)

(56) References Cited

U.S. PATENT DOCUMENTS

| | | | |
|---|---|---|---|
| 2011/0115906 A1* | 5/2011 | Su | H04N 7/186 348/143 |
| 2014/0140444 A1* | 5/2014 | Onishi | H03L 7/104 375/320 |
| 2016/0036958 A1* | 2/2016 | Logan | H04W 68/00 455/414.1 |
| 2016/0226823 A1* | 8/2016 | Ansari | H04L 63/20 |
| 2017/0005515 A1* | 1/2017 | Sanders | H02J 3/381 |

FOREIGN PATENT DOCUMENTS

| | | | |
|---|---|---|---|
| EP | 2608511 A1 | | 6/2013 |
| WO | 2014073183 A1 | | 5/2014 |
| WO | WO2014073183 | * | 5/2014 |

* cited by examiner

NETWORK-ENABLED DOOR STATION EXTENDER

TECHNICAL FIELD

The present disclosure relates to the field of door stations. More specifically, this disclosure relates to provision of network-enabled functionality for door intercom systems lacking network connectivity.

BACKGROUND

Individuals increasingly seek convenience and safety across many aspects of their lives. In line with those priorities, door intercom and answering stations have been very popular across a variety of residential and commercial applications. A number of systems have arisen for providing people with means for convenient, secure two-way communications with visitors at their door, without requiring occupants to travel to and/or open their door.

Recently, Internet-enabled door stations have begun providing users with valuable and highly-desirable capabilities. Examples include providing notifications to a user's smartphone, and enabling users to listen to, see, and/or communicate with door station visitors from any location, via a smartphone app. However, many structures have legacy door station systems installed, that lack such network-enabled capabilities. Such systems may utilize analog or non-standardized digital protocols to transmit audio and/or video information between door stations. Such legacy systems typically cannot interact with a user's smartphone, or easily provide off-premises notification or communication capabilities.

While modern network-based communication capabilities may be desirable, replacing legacy door station equipment may be undesirable. The cost of purchasing new equipment may be prohibitive, particularly for installations that include multiple door stations. Additionally, such systems may require extensive wiring and other physical installation efforts, making a replacement project even more costly, time-consuming and labor intensive.

SUMMARY

Methods and apparatuses are provided to retrofit existing intercom and door station systems with Internet Protocol communication capabilities. A communications module may be connected to a legacy door station installation via a software-configurable communications interface, configured to implement communications protocols used by the legacy system to interconnect various door stations. Such legacy protocols may include analog and/or digital (whether standards-based or proprietary) communications protocols. The communications module may further include a network interface to facilitate communications via an IP-based network, preferably including the Internet. A communications module controller can implement application code to enable various communications with other networked devices, such as user smartphones, tablets, computers, smart appliances, SIP-based telephones, smart home controllers and control panels, and the like. Thus, in various embodiments, the communications module may enable a variety of functional interactions between networked devices and the legacy door stations, including, without limitation: providing user notifications when a visitor pushes a call button of a door station; transmitting audio and/or video signals from a door station to and/or from a networked device, potentially enabling two-way communications between the door station and networked device without regard to the networked device's physical location; and using a networked device to cause the door station to release a door latch.

According to an exemplary embodiment according to the invention, a communications module for a door station may comprise a connection interface for communications with at least one door station in accordance with a door station communication protocol, a network interface for communications in accordance with a network communication protocol, e.g. via a network to which the network interface may be connectable, and a controller coupling the network interface and the connection interface. The controller may be configured to set or change the door station communications protocol of the connection interface. After the controller has set or changed the door station communications protocol of the connection interface, the connection interface is configured to communicate with the at least one door station in accordance with the door station communications protocol as set or changed by the controller.

In some embodiments, the controller may be configured to select a door station communication protocol from a plurality of predefined door station communication protocols stored in a memory. The memory may be, for instance, an internal memory which may be integrated in the communications module, or an external memory, for instance, integrated in a networked device, such as in a server. For instance, the controller may be configured to access the external memory via the network interface. One or more or each one of the stored predefined door communications protocols may be specific to a particular brand or manufacturer of door stations or even specific to a particular model of a door station. The controller may be configured to set or change the door station communications protocol of the connection interface in accordance with the selected door station communication protocol. In this manner, the connection interface can be configured for communications with a variety of different types of door stations.

In some embodiments, the controller may be configured to set or change the door station communications protocol of the connection interface automatically. For instance, the controller may be configured to automatically set or change the door station communications protocol of the connection interface based on an analysis of signals received with the connection interface from a door station connected with the connection interface. In some embodiments, the controller and/or the connection interface may be configured to automatically analyze the signals received from a door station, e.g. by means of a dedicated signal analyzer circuitry. For instance, based on the analysis, the controller may be configured to determine the brand, manufacturer and/or model of the door stations and select the corresponding door station communications protocol from the aforementioned memory and to set or change the door station communications protocol of the connection interface in accordance with the selected door station communication protocol. Additionally or alternatively, in some embodiments, the controller may be configured to set or change the door station communications protocol of the connection interface based on user input which may be input by the user by means of a networked device, transmitted via a network (e.g. the Internet) and received with the network interface. The user input may include information specifying, for instance, a door station manufacturer, a door station brand and/or a door station model. The controller may be configured to select the corresponding door station communications protocol from the aforementioned memory and to set or change the door station communications protocol the connection interface in accordance with the selected door station communication protocol.

As mentioned above, a door station communications protocol may be predefined and/or specific to a particular brand or manufacturer of door stations or even specific to a particular model of a door station. Different door stations (e.g. different models or brands of door stations) may implement door station communications protocols that are not compatible with each other. Enabling the connection interface to communicate with a specific door station may therefore require configuring the connection interface to communicate according to the door station communications protocol implemented by that specific door station. For instance, a door station communication protocol may include communicating that a call button was pressed at the door station. In some embodiments, the door station communication protocol may include audio communication. In some embodiments, the door station communication protocol may include video communication. In some embodiments, the door station communication protocol may include determining which and/or how many call button(s) of the door station was/were pressed. In some embodiments, the door station communication protocol may include one or more of: determining if audio communication can be established, determining if audio communication is currently established, signaling that a handset has been picked up or hung up, determining if a switching relay (e.g. for a door-latch) can be triggered, signaling that a switching relay (e.g. for a door-latch) should be triggered, signaling that a door latch of the door station should be released. Accordingly, in some embodiments, the controller may be configured to implement one or of the following functions (if supported by the door station communication protocol): determine which call button or call buttons of the door station was/were pressed, determine the number of call buttons that were pressed; determine and/or monitor whether a voice or audio communication is currently established; determine and/or monitor whether a voice or audio communication is or can currently be established; determine and/or monitor whether a video communication is currently established; determine and/or monitor whether a video communication can currently be established; signalize that a handset of an indoor door station has been picked up, e.g., in order to enable or initiate audio and/or video communications between the connection interface and a (outdoor) door station; signalize that a handset of an indoor door station was hung up, e.g., in order to terminate audio and/or video communications between the connection interface and a (outdoor) door station and/or to enable audio and/or video communications between other indoor door stations and the (outdoor) door station; signalize that a switching relay of a (outdoor) door station should be triggered (e.g. for a door-latch) and, optionally, if supported, for how long the switching relay should be triggered and/or in which direction the switching relay should be triggered, for instance, in order to open a door and/or to switch on a light source.

A door station system according to an exemplary embodiment of the present invention may comprise at least one door station and at least one communications module, such as the aforementioned communication module in accordance with any of the embodiments described herein. In some embodiments, the door station system may comprise at least one wired or wireless communications link connecting the connection interface of the communication module with at least one connection interface of the at least one door station of the door station system. The communications link may include, for instance, at least one of a single communications bus, a central hub or a chained configuration. In some embodiments, the at least one door station may comprise a microphone and/or a loudspeaker for generating/transmitting audio signals. In some embodiments, the at least one door station may comprise a video camera for generating video signals.

An exemplary method of operating a communications module of a door station, for example, the aforementioned communication module which may, for instance, be part of the aforementioned door station system, may comprise one or more of the following steps: (1) transmitting signals between a connection interface of the communications module and at least one door station using a door station communication protocol, (2) transmitting signals between a network interface of the communication module with at least one networked device using a network communication protocol, (3) transmitting signals between the network interface and the connection interface by means of a controller of the communications module, and (4) setting or changing the door station communications protocol of the connection interface using the controller of the communications module. In some embodiments, the method may include further features and steps as disclosed herein, for instance, in relation to exemplary embodiments of the communication module and door station system.

Thus, the connection interface may be configured to be connected with the at least one door station and to send signals and receive signals to/from the door station in accordance with the door station communication protocol, for example, via a connection link which may connect the connection interface of the communications module with a connection interface of the respective door station. The transmitted signals may carry information encoded in accordance with the door station communication protocol. The information may include audio information and/or video information. In some embodiments, the connection interface may be configured or configurable for communications with the one or more door stations using a non-IP based door station communication protocol, for instance an analog door station communication protocol and/or a digital door station communication protocol. In some embodiments, as mentioned above, the door station communication protocol may include audio and/or video communication, for instance. Further examples of (door station) communication protocols are provided above and further below. The communication module may, for instance, includes one or more analog-to-digital converters (ADCs) configured for receiving analog input signals according to an analog communication protocol, and generating a digitized output for subsequent processing by the controller.

The network interface may be configured to be connected to a network, for instance, to the Internet or another type of network. The network interface may be configured to send signals and receive signals to/from the network, or via the network to/from a further (networked) device connected to the network, in accordance with the network communication protocol. The transmitted signals may then carry information encoded in accordance with the network communication protocol. The information may include audio information and/or video information. For example, the network communication protocol used by the of the network interface for communication may include one or more of Internet Protocol (IP), Bluetooth, Zigbee, Z-Wave, or any of the network communication protocol mentioned further above or below. The network may therefore be, for instance, an IP-based network, Bluetooth-based network, a Zigbee-based network, or Z-Wave-based network, or a combination of two or more of these networks.

The controller may be configured to transmit signals (encoding, for instance, any of the information mentioned above or further below) between the network interface and the connection interface and may thereby, for instance, transmit (in any one of both directions) signals and correspondingly encoded information between the at least one door station and the networked device via the network. The signals may include, for instance, video signal and/or audio signals (e.g. from a door station to a networked device and/or from a networked device to the door station). The audio signals may be generated by means of a microphone of the door station or by means of a microphone of the networked device, respectively. After being transmitted via the network, the audio signals may be played back by means of a loudspeaker of the networked device or by means of a loudspeaker of the door station, respectively. Accordingly, the video signals may be produced by means of a camera of the door station or, if supported, by means of a camera of the networked device, respectively. After being transmitted via the network, the video signals may be played back by means of a video screen or display of the networked device or, if supported, by means of a video screen or display of the door station, respectively. In this manner, two-way audio and/or one-way or two-way video communications may be enabled between the door station and the networked device. In some embodiments, as mentioned above, the signals may provide, for instance, user notifications on the networked device when a visitor pushes a call button of a door station; or cause the door station to release a door latch. Further examples of transmitted signals and transmitted information are provided above and further below.

In some embodiments, as mentioned above, the communication module may include a memory configured to store a plurality of different predefined door station communication protocols. For instance, each one of the stored predefined door station communication protocol may correspond to a specific door station model and/or to a specific door station brand and/or to a specific door station manufacturer. The controller may be coupled to the memory and configured to select one of the predefined door station communication protocols stored in the memory and to set or change the door station communications protocol used/implemented by the connection interface in accordance with the selected door station communication protocol. The selection may be based, for instance, on a user input received via a networked device and/or based on an analysis of signals received by the respective door station.

In some embodiments, the connection interface may includes a (dynamic) signal generator circuit which may include at least one adjustable electrical or electronic component which may adapted for providing at least one adjustable signal output range of the generator circuit. For example, the at least one adjustable signal output range of the at least one adjustable electrical or electronic component may be adjustable to cover at least one of the following maximal output ranges, for instance: a voltage output range of 0 to 60 Volts, a current output range of 0 to 5 Ampere, a power output range of 0 to 5 watts of power, and/or an output signal frequency range of 50 Hz to 100 MHz. In some embodiments, the at least one adjustable electrical or electronic component of the signal generator circuit may be selected from the group consisting of adjustable Zener diodes, adjustable resistors, adjustable voltage sources, and/or adjustable current sources. In some embodiments, when setting the door station communication protocol of the connection interface, the controller may be configured to set or change a working point and/or an adjustable output range of the at least one adjustable electrical or electronic component of the dynamic signal generator circuit. For instance, the adjustable output range may be set or change to be a sub-range within any one of the aforementioned maximal output ranges.

In some embodiments, as mentioned above, the connection interface may include a signal analyzer circuitry configured to determine signalling characterizations on the basis of signals received from the at least one door station. The connection interface may be configured to transmit corresponding signal characterizing information to the controller of the communications module. The controller may be configured to set or change the door station communications protocol of the connection interface based on the signal characterizing information. For instance, the controller may be configured to select one of the aforementioned stored door station communication protocols stored in the memory based on the signal characterizing information and subsequently set or change the door station communication protocol of the connection interface in accordance with the selected door station communication protocol. In some embodiments, the signal analyzer circuitry may be configured, when determining the signal characterizations, to determine one or more of a characteristic voltage types, a characteristic voltage levels, characteristic signalling voltage levels, characteristic voltage level changes, AC voltage frequencies or frequency ranges, the presence of a plurality of frequencies, and/or the presence of DTMF tones. In some embodiments, the signal analyzer circuitry may include an adjustable comparator, an analog/digital converter and/or a signal analysis unit.

In some embodiments, the controller may be configured to set or change the door station communications protocol of the connection interface based on a user input received via the network interface, for instance, via any of the networked user devices mentioned above or in the following.

In some embodiments, the network interface may be configured for communications with one or more networked devices selected from the group including user smartphones, tablets, computers, smart appliances, SIP-based telephones, smart home controllers and control panels.

These and other aspects of the embodiments will become apparent in light of the disclosure elsewhere herein.

DESCRIPTION OF THE PREFERRED EMBODIMENTS

Figure 1:
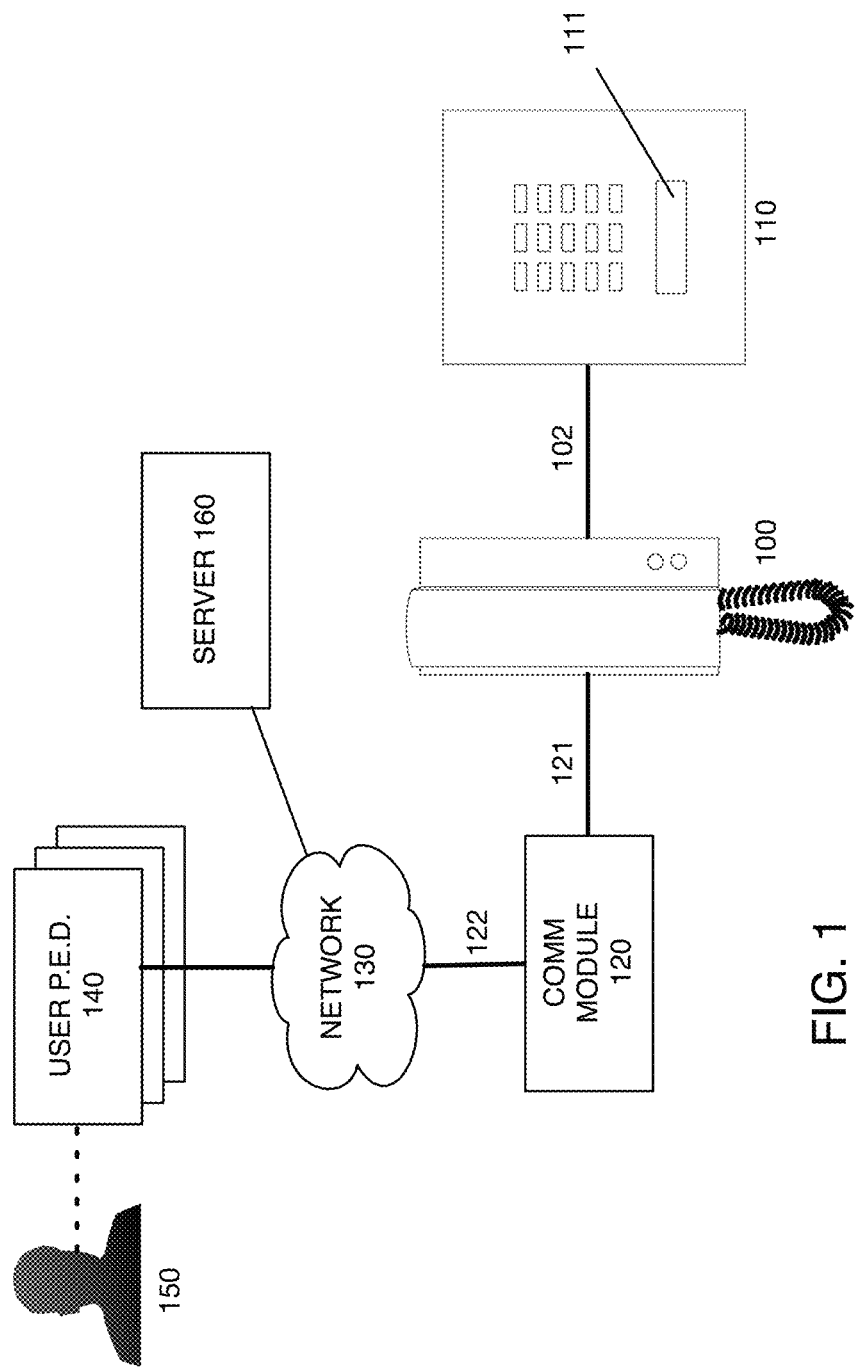
FIG. 1 is a schematic representation of a door station system with network communications module.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

FIG. 1 illustrates an exemplary embodiment of a door station system, incorporating a communications module to facilitate Internet Protocol (IP) based interactions with network-connected devices. Door stations 100 and 110 are conventional components of a door station system in which devices communicate using communication protocols other than IP, such as analog communications or digital communications (whether a proprietary protocol or a non-IP standards-based protocol). Specifically, door station 100 is an indoor station, typically mounted within a structure, such as a home or office. Door station 110 is an outside door station, typically mounted at a structure entry point, such as a front door. Communications link 102 enables door station 100 to communicate with door station 110 via, e.g., a communications protocol other than IP.

The embodiment of FIG. 1 illustrates a single door station 100 and a single door station 110. However, it is contemplated that in some embodiments, door station systems may include any number of stations. For example, a particular residence or office space may include multiple inside door stations 100, located at various locations within a space. In some embodiments, a multi-tenant facility may include one or more inside door stations 100 within each of multiple tenant spaces. In some embodiments, a door station system may include multiple outdoor stations 110, such as stations located at each of multiple structure entrances. In some embodiments, each of multiple door stations 100 and 110 may communicate via a single communications bus 102; in other embodiments, door stations may be connected via a central hub or in a chained configuration. These and other embodiments may be utilized in connection with concepts described herein.

FIG. 1 also illustrates door stations 100 and 110 with audio capabilities. Specifically, indoor door station 100 includes an audio handset, and a ringer mechanism or loudspeaker for alert notifications. Outdoor station 110 includes a loudspeaker (e.g. for playing content spoken into the handset of door station 100), a microphone (e.g. for relaying a visitor's spoken content to door station 100), and a button 110 (e.g. for triggering an alert on door station 100). However, it is understood that in some embodiments, door station 100 and/or 110 will further include video capabilities, such as a video camera capable of capturing video content proximate the door station and relaying that content to an associated door station, thereby enabling users of door station 100 and/or 110 to see users of another connected door station. In yet other embodiments, user interfaces may be provided instead of or in addition to button 110; examples may include a keypad, a touchscreen display, a voice recognition module, a camera with facial recognition logic, and a QR code or barcode scanner.

Figure 2:
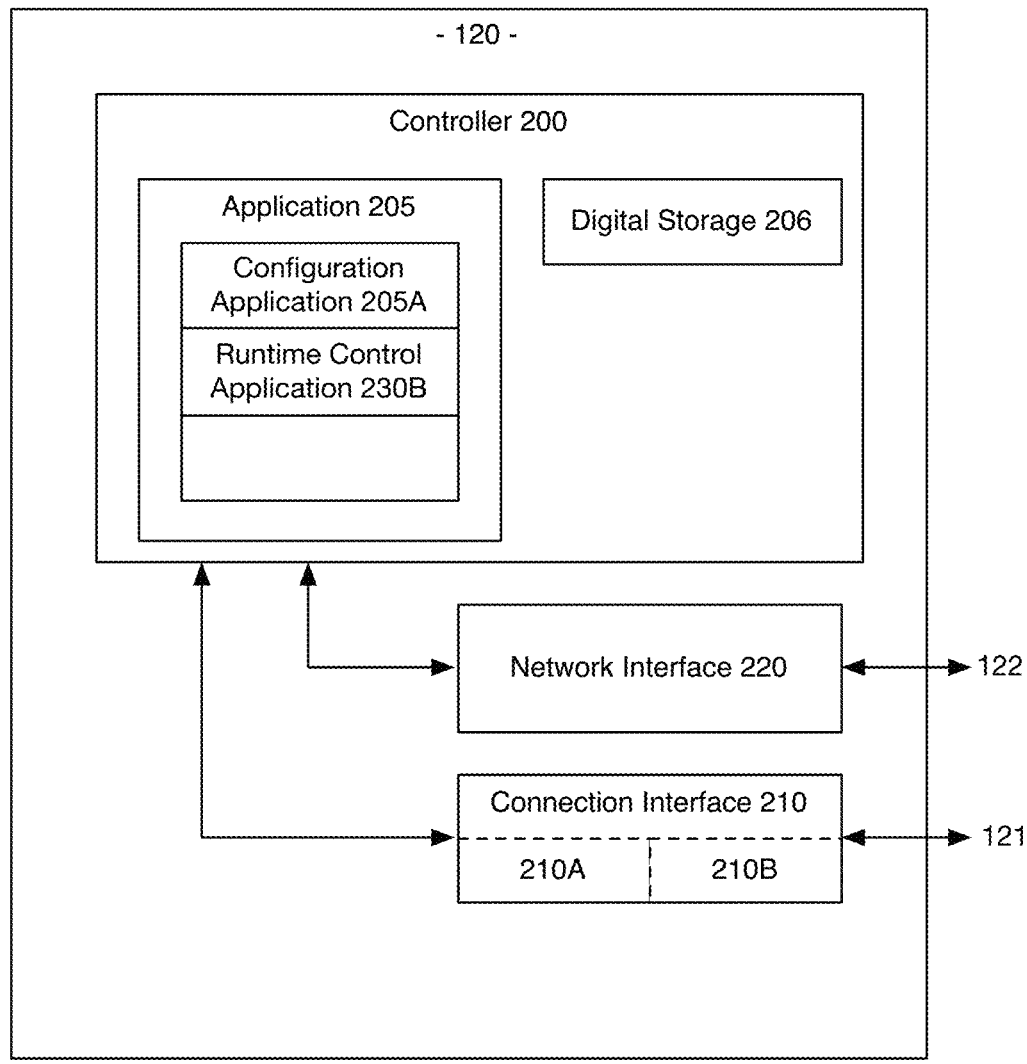
FIG. 2 is a schematic block diagram of a door station network communications module.

Communications module 120 may be provided and interconnected with the door station system of FIG. 1, in order to facilitate IP-based communications with various devices external to the door station system, such as user personal electronic devices 140. Communications module 120 is illustrated in further detail in FIG. 2. Communications module 120 includes controller 200, communicating with connection interface 210 and network interface 220. Controller 200 is a microprocessor-based controller, implementing application 205 to perform various functions described further herein.

Connection interface 210 is preferably a software-configurable communications interface connected via communications link 121 to the legacy door station system. For example, in an embodiment in which door stations are connected along a common communications bus, connection interface 210 may be connected similarly with door stations such as door station 100. Communications link 121 implements a communications protocol determined by the communication specifications of door stations 100 and 110.

For example, in some embodiments, door stations 100 and 110 may communicate via an analog communication protocol, such as a loop-based analog voice protocol comparable to subscriber stations of traditional analog public telephone services. In such embodiments, communications module 120 includes one or more analog-to-digital converters (ADCs) receiving analog input signals via connection 121 and generating a digitized output for subsequent processing by controller 200. Such ADCs may be, for example, integrated within connection interface 210 (whereby connection interface 210 output digital signals to an input of controller 200); or integrated within controller 200 (whereby connection interface 210 relays analog inputs to an ADC input of controller 200).

In other embodiments, door stations 100 and 110 may communicate via a serial digital protocol with predetermined messaging format. In such embodiments, connection interface 210 may include a signaling protocol conversion circuit ensuring that signaling output to connection 121 is compatible with door stations 100 and/or 110.

Legacy door station systems use a wide variety of signaling protocols, with various combinations of digital and/or analog signals, different voltage ranges, and different signal frequencies. Conventionally, door station equipment from a particular hardware vendor is designed to interoperate only with equipment from the same hardware vendor. However, it may be desirable for communications module 120 to interoperate with a wide variety of legacy door station systems. Therefore, preferably, connection interface 210 includes a dynamic signal generator circuit 210A capable of outputting a variety of different signaling formats to facilitate interoperability of communication module 120 with a variety of devices. Such circuitry may include, for example, use of adjustable Zener diodes, adjustable resistors, and adjustable current and voltage sources having a range of output capabilities that transmits signals in the range of for instance 0 to 60 Volts AC or DC. Connection interface 210 may also be specified to output up to 5 amps of current, 5 watts of power, and signal frequencies in the range of 0 to 100 MHz. While most door station communication protocols operate in only a small portion of these ranges, controller 200 dynamically configures connection interface 210 to operate at a range and working point associated with varying models of door stations 100 and 110. Thus, such specifications have been found to be sufficient for communications with most legacy door station systems.

Connection interface 210 may further include signal analyzer circuitry 210B, such as a frequency analyzer having a range of, e.g., 50 Hz to 100 MHz, and a wave/signal form analyzer supporting e.g. rectangular, sinusoidal, DC and AC waveforms. Such analyzer circuitry 210B may enable connection interface 210 to characterize signaling from door station 100 and/or 110 received on line (communication link) 121 or received on line (communication link) 102, relaying such characterizing information to communications module 120.

Figure 6:
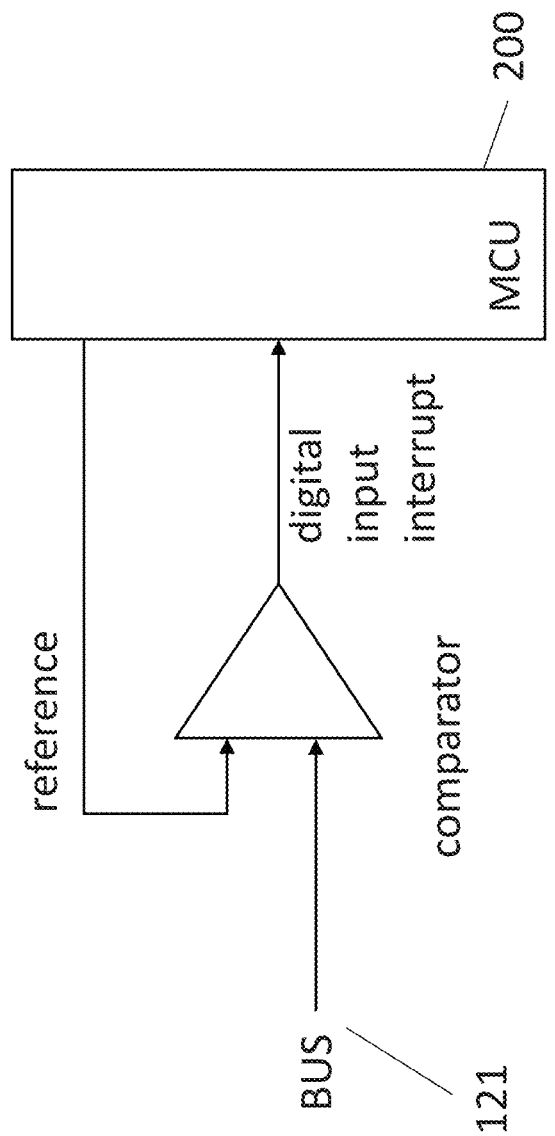
FIG. 6 is a schematic representation of an adjustable comparator connected to the controller of a door station network communications module.

Signal analyzer circuitry 210B may optionally comprise at least one adjustable comparator, at least one analog/digital converter and/or at least one signal analysis unit. An example adjustable comparator is shown in FIG. 6. One input of the comparator is connected to line 121 or to line 102. Controller 200 may provide a reference voltage to a reference input of the comparator. Controller 200 may set the reference voltage in accordance with a voltage to be detected by the comparator. The output of the comparator may provide a digital input interrupt to an input of controller 200.

In one embodiment, to facilitate determination of the aforementioned characterizing information of the signaling, signal analyzer circuitry 210B may detect one or more of a voltage type, for example AC or DC voltage; voltage levels, for example an idle voltage level, a signaling voltage level or the like; voltage level changes, for example a change from a first voltage level to a second voltage level; AC voltage frequency or frequency ranges, for example audio signal frequencies, video signal frequencies or the like; the presence of a plurality of frequencies, for example DTMF tones and the like. Additionally or alternatively, signal analyzer circuitry 210B may detect the number of active connection lines on communications link 121 or communications link 102. The detection of characterizing information may be performed on each line of on communications link 121 or communications link 102. Signal analyzer circuitry may also detect combinations of the foregoing characterizing signaling information, for example, the presence of an audio or video signal and the associated signal level, to adjust the corresponding configuration of audio or video signal level in dynamic signal generator circuit 210A.

Communications module 120 may then cross-reference characterizing information received from connection interface 210 with known signaling characterizations (which may, for example, be stored locally in controller digital memory 206, or remotely such as by server 160), in order to identify information, such as byte sequence, that may be used by communications module 120 to facilitate communications between communications module 120 and door stations 100 and/or 110. For example, through characterization of signaling on line 121 or line 102, communications module 120 automatically identify (i.e. without requiring user identification) a model of door station 100 and 110, and/or a signaling protocol specification used by door stations 100 and 110. With this information, communications module 120 may subsequently receive, relay, and transmit control and content signaling to and from door stations 100 and 110, such as detection of ring events and sending of door open events. Through this mechanism, communications module 120 can effectively, and in some cases automatically, control and/or interact with a wide variety of legacy door station systems, without significant user configuration. For instance, controller digital memory 206 and/or server 160 may store a plurality of different predefined door station communication protocols. For instance, each one of the stored predefined door station communication protocol may correspond to a specific door station model and/or to a specific door station brand and/or to a specific door station manufacturer. The controller 200 may be configured to select one of the predefined door station communication protocols stored in controller digital memory 206 and/or server 160 (e.g. via network interface 220 and network 130) which correspond to door station 100 and/or 110 and to set or change the door station communications protocol of the connection interface 210 when communicating with door station 100 and/or 110 in accordance with the selected door station communication protocol. The selection may be based, for instance, on a user input received via networked device 140 and/or based on an automatic identification of models of door station 100 and/or 110, which in turn may be based on an analysis of signals received by the respective door station 100 or 110, e.g. on the above mentioned characterization of signaling on line 121 or line 102.

In some embodiments, controller 200 may configure connection interface 210 according to a signaling protocol and/or configuration for line 121 or line 102 that is associated with a brand and model of door station 100 and/or 110. The configuration may be maintained for a predefined period of time, and cyclically changed to configurations for different brands and models of door station 100 and/or 110. If the connection interface 210 detects known signaling characterizations associated with the configured brand and model of door station 100 and/or 110 within the predefined period of time, it signals brand and model of door station 100 and/or 110 to the controller 200. In some embodiments, connection interface 210 may determine first characterizing signaling information on line 121 or communication bus 102 and then cycle through configurations associated to a subset of brands and models of door stations 100 and/or 110 that are characterized by the first detected signaling information. If the connection interface 210 detects second known signaling characterizations associated to the configured brand and model of door station 100 and/or 110 within the predefined period of time, it signals brand and model of door station 100 and/or 110 to the controller 200.

In some embodiments, such as when communication module 120 does not automatically identify signaling protocol associated with door stations 100 and/or 110, a user may provide needed configuration to enable effective communications. For example, controller 200 may implement configuration application 205A to interact with a user's PED 140 (such as a smartphone) and enable a user 150 to identify a brand and model associated with legacy door stations 100 and/or 110. Configuration application 205A may then determine a signaling protocol and/or configuration for connection interface 210 that is associated with the brand and model of door stations 100 and/or 110, and cause controller 200 to configure connection interface 121 accordingly.

In some embodiments, controller 200 may implement a training mode. For example, controller 200 may implement configuration application 205A to interact with a user's PED 140 (such as a smartphone) and prompt the user to execute a predefined action, for example ringing the door bell on legacy door stations 100 and/or 110. Controller 200 may configure connection interface 210 according to a signaling protocol and/or configuration for line 121 or communication bus 102 that is associated with the predefined action for a brand and model of door station 100 and/or 110. The configuration may be maintained for a predefined period of time, and cyclically changed to corresponding configurations for different brands and models of door station 100 and/or 110. If the connection interface 210 detects the predefined action, it signals the corresponding brand and model of door station 100 and/or 110 to the controller 200.

Communication module 120 also includes network interface 220, connected to IP-based network 130 via network connection 122. Network interface 220 enables bidirectional communications between controller 200 and other devices connected to network 130, such as personal electronic devices 140. For example, in some embodiments, network interface 220 will include an 802.11 wireless Ethernet adapter, and network 130 will include a user's home wireless data Local Area Network with an Internet Service Provider connection to a Wide Area Network, including the Internet. In other embodiments, network interface 220 may include a wired connection to network 130.

A variety of network-connected devices may be utilized to interact with communications module 120, and in turn door stations 100 and/or 110. Common examples may include a smartphone or tablet computer. In other embodiments, communications module 120 may interface with a home automation system, smart home appliances, SIP-based telephones, personal computers, and other devices.

Figure 3:
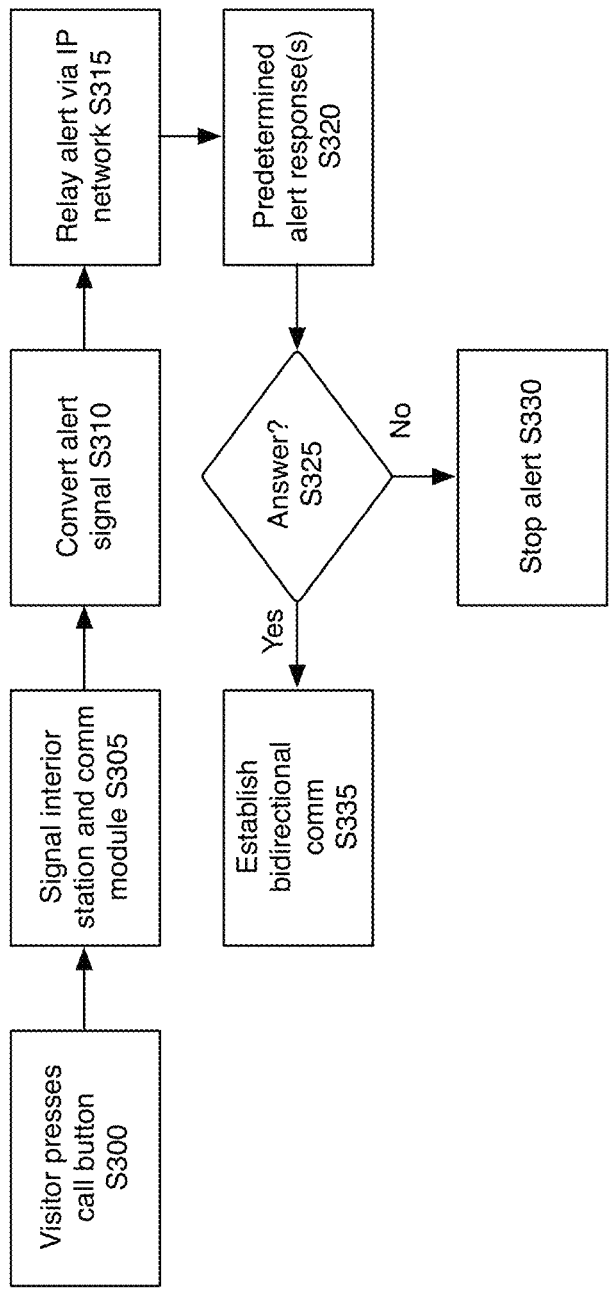
FIG. 3 is a process for visitor notifications via network-connected devices.

In operation, communications module 120 enables a variety of different interactions between door stations 100 and/or 110, and network-connected devices. FIG. 3 illustrates an exemplary interaction, which may be implemented using controller 200 executing runtime control application 205B. In step S300, a visitor to door station 110 presses call button 111. In step S305, exterior door station 110 signals interior door station 100 via connection 102, causing indoor door station 100 to generate an audible and/or visual alert. Simultaneously, connection 102 is coupled with connection 121, relaying signaling from door station 110 to communications module 120. In step S310, connection interface 210 converts the alert signaling to a format for receipt by controller 200. Controller 200 transmits notifications to one or more configured PEDs 140 via network interface 220 and network 130 (step S315).

In step S320, each PED 140 receives the alert signaling transmitted in step S310 and undertakes a predetermined, configurable response. For example, a smartphone PED may be configured to emit audible and/or visible notifications to an associated user. In another embodiment, a smart home controller PED may be configured to emit audio notifications via a home audio system. In another embodiment, a smart appliance, such as a network-connected refrigerator with integrated display panel, may be configured to display a notification of the door station caller. These and other interactions may be readily configured in various embodiments.

Some IP network devices, such as smartphone or tablets, may enable answering of a door station notification directly, whereby users may communicate directly with a door station caller. For example, in step S325, a PED 140 may determine whether a visitor notification alert is answered. If not, the alert notification may be terminated by PED 140 after a period, and/or after door station 110 stops emitting an alert (step S330). If so, in step S335, a bidirectional communications link may be established via PED 140, network 130, communications module 120 (namely, via network interface 220, controller 200, connection interface 210) and door station 100 and/or 110.

Examples of signals that may be received by connection interface 210 and relayed by controller 200 via network interface 220 include, without limitation: event notifications that a visitor has pressed a door station keypad; even notifications to open/unlock a gate or door (e.g. via actuation of an electronic door release already integrated with existing external door station 110); audio signals; video signals; and additional communication signals if required to enable the communication between the exterior door station 110 and the connection interface, and/or between controller 200 and application 205.

In some embodiments having door locks or door releases controlled by a legacy door station, communications module 120 may provide new and improved functionality, without replacing the existing door components. For example, in application such as AirBNB or other temporary apartment rental, short term tenants may be provided with access to lock or unlock a property using their smartphone, without providing the tenant with a key (which may be copied, lost or stolen). In other applications, geofencing may be applied using an individual's smartphone, whereby the smartphone may automatically cause communications module 120 to signal external door station 110 to release a door latch when the individual approaches the door from the outside.

Figure 4:
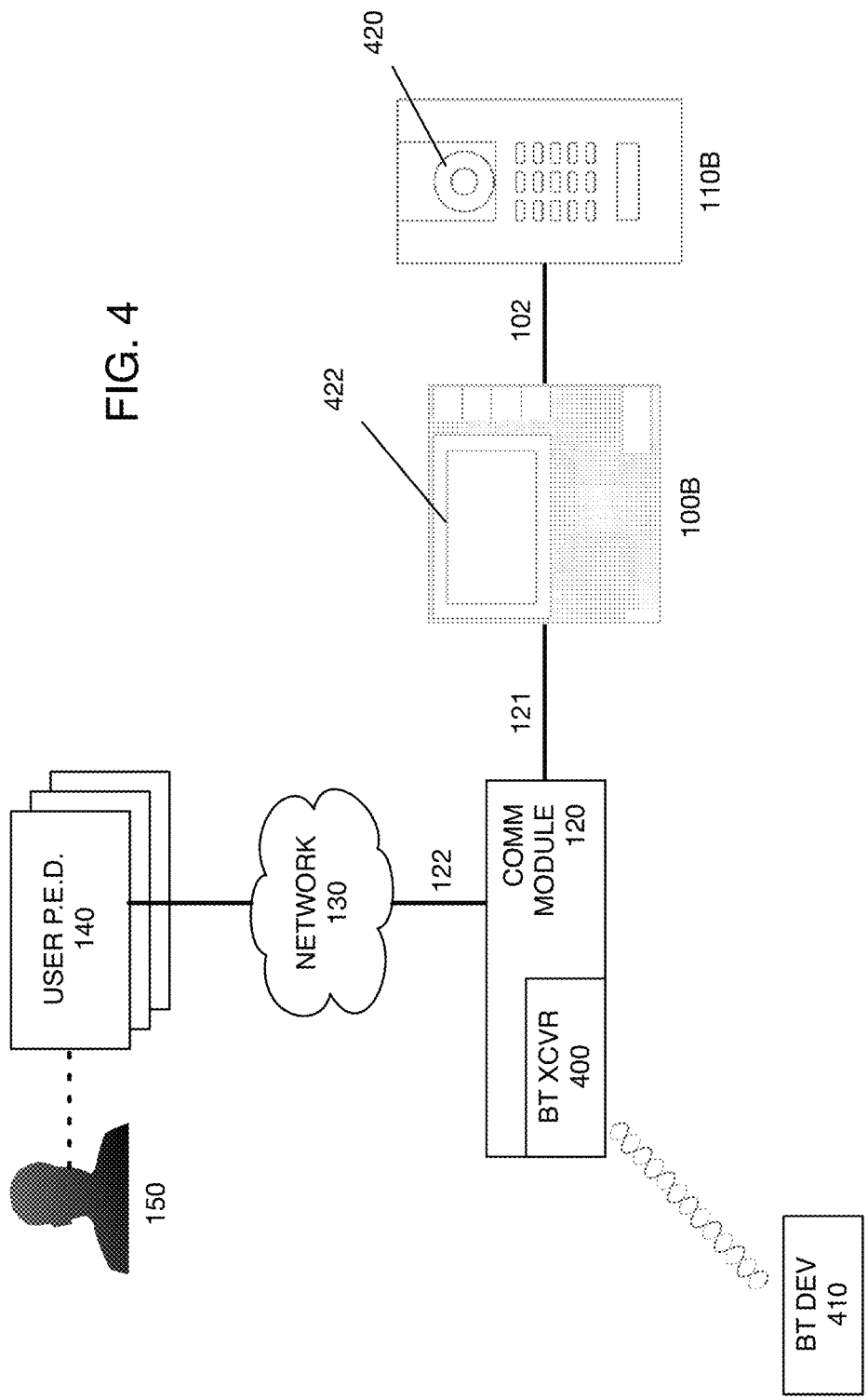
FIG. 4 is a schematic representation of a door station system with network communications module and wireless interface.

In the embodiment of FIG. 1, controller 120 facilitates conversion and relaying of signaling between door station communication link 102, and IP network 130. However, it is contemplated and understood that in other embodiments, communications module 120 may facilitate other types of communications, in addition to or instead of IP network 130. For example, in the embodiment of FIG. 4, communications module 120 further includes a Bluetooth transceiver 400. Bluetooth transceiver 400 enables wireless communications with nearby Bluetooth-enabled devices 410. Bluetooth-enabled devices 410 may include, for example, locks that may be actuated and/or report their lock status via Bluetooth control, and/or security sensors that may broadcast the open or closed state of a door, window or garage. These and other wireless devices may thereby be integrated for reporting and/or control from a door station and/or remote networked device. Further, while the embodiment of FIG. 1 illustrates use of a Bluetooth transceiver for wireless communications, it is contemplated and understood that other wireless communication protocols may be effectively employed instead of, or in addition to, Bluetooth, including, without limitation, Zigbee and Z-Wave. The embodiment of FIG. 4 further illustrates legacy door stations capable of both video and audio signal transmission. Specifically, exterior door station 110B having an integrated video camera 420 and video-transmission capabilities, as described further hereinabove. In turn, interior door station 100B includes display screen 422, capable of display video imagery captured at external door station 110B by camera 420.

In some embodiments, network-connected devices capable of communication with module 120, and in turn door station 100 and/or 110, include a server, such as server 160. Servers may be utilized to interact with communications module 120 and/or door stations 100 and/or 110, for a variety of applications. For example, server 160 may provide secure remote access to communications module 120, so that users can control, e.g., door stations 100 and 110 from remote locations via, e.g., a website or web-service control application or app. Such embodiments may be desirable for, e.g., an elderly homeowner having a family member desiring to assist with letting caregivers or delivery people into a home; or a home rental service allowing new tenants into a home. In some embodiments, communications module 120 may relay audio and video communications from door station communication link 102, via network 130, to server 160 for storage and remote access. In some embodiments, server 160 may be operated by a package delivery service, whereby a user has provided the service with authorization to remotely unlock a door to facilitate indoor package delivery.

Figure 5:
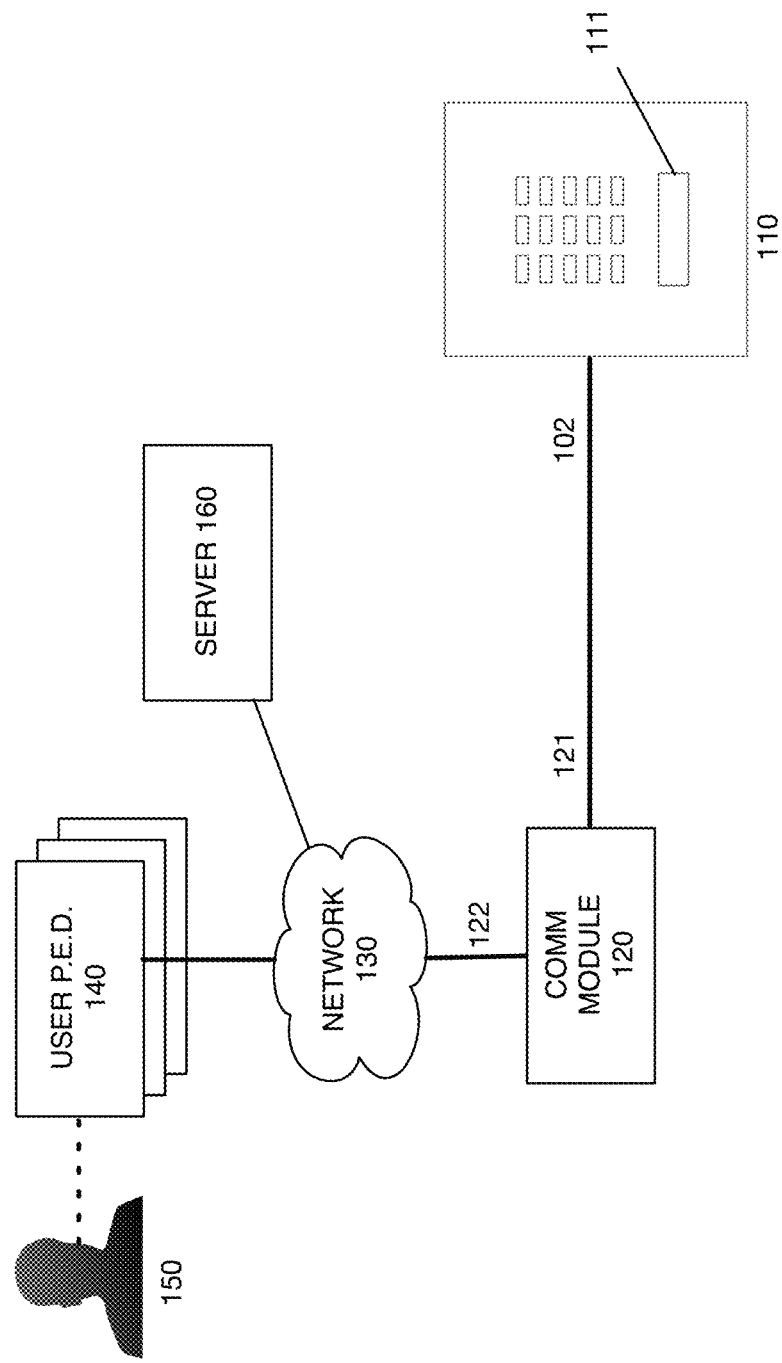
FIG. 5 is a schematic representation of a door station system with network communications module in lieu of an internal door station.

While some embodiments include legacy door station systems that include both an external door station 110 and an internal door station 100, it is contemplated that in other embodiments, communications module 120 may be utilized with only an external door station, where no internal door station exists. FIG. 5 illustrates such an embodiment, in which communication module 120 is connected directly to external door station 110. Network-connected devices 140 may be utilized in lieu of an internal door station, to enable user interactions with external door station 110. Such embodiments may be particularly use where, for example, a property is partitioned into a greater number of units than were provided during initial system installation, or where an interior door station is damaged or otherwise fails.

The previous description of the disclosed embodiments is provided to enable any person skilled in the art to make or use the invention disclosed herein. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. All references cited herein are expressly incorporated by reference.

The present disclosure relates, inter alia, to the following aspects:

1. A door station system, for instance, an analog/digital door intercom to IP converter system, said system comprising:
   a. At least one door station, comprising one or more of
      i. At least one microphone
      ii. At least one speaker
      iii. At least one keypad that is a touch screen or a keyboard with at least one button
      iv. At least one micro controller (MC1)
      v. At least one communication interface for transmitting door communications signals (such push of the keypad events, open/unlock door events, audio signals) that is not based on the Internet Protocol (IP).
   b. At least one communications module, e.g. a converter module, comprising one or more of:
      i. At least one computerized controller (CC1)
      ii. At least one connection interface (CI1) which connects the computerized controller CC1 to the door station, e.g., either via wire or wireless or a combination of both.
      iii. At least one network interface (NI1) supporting the Internet Protocol (IP) which can connect the computerized controller CC1, for instance, to a local area network (LAN) or wide area network (WAN) ora combination both, either via wire or wireless or a combination of both.
      iv. At least one software application (SA1) running on the computerized controller CC1.
         The software application (SA1) implementing one or more of the following functionalities or operations:
      v. Wherein the software application (SA1) can receive signals coming from one or more door stations connected to the connection interface (CI1).
      vi. Wherein the software application (SA1) can send signals to one or more door stations connected to the connection interface (CI1).
      vii. Wherein the software application (SA1) can receive signals coming via the network interface NI1.
      viii. Wherein the software application (SA1) can send signals to the network interface NI1.
      ix. Wherein the software application (SA1) can analyze and/or modify signals coming from the connection interface (CI1) or network interface NI1.
      x. Wherein said signals sent and received via the connection interface (CI1) and network interface NI1 can be one or more of:
         1. Event notifications that a visitor has pressed the keypad at the door station
         2. Event notifications to open/unlock a gate or door
         3. audio signals and/or video signals
         4. additional communication signals if required to enable the communication between the exterior door station module (ED1) and the connection interface (CI1) and the computerized controller (CC1) and the software application (SA1)
      xi. Wherein said signals received via the connection interface (CI1) can be analog or digital (or a combination of both) signals can have an almost any waveform/signal form (such as e.g. rectangular, sinusoidal, DC, AC) as well as nearly any voltage (such as e.g. 0-60 V), almost any current (such as 0 . . . 5 Ampere), almost any frequency (such as e.g. 50 Hz-100 MHz)
      xii. Wherein said signals received generated by the communications module (e.g. converter module) and sent via the connection interface (CI1) can be analog or digital (ora combination of both) signals can have an almost any waveform/signal form (such as e.g. rectangular, sinusoidal, DC, AC) as well as nearly any voltage (such as e.g. 0-60 V), almost any current (such as 0 . . . 5 Ampere), almost any frequency (such as e.g. 50 Hz-100 MHz).
2. The door station system according to aspect 1, wherein the door station further comprises a video camera and said signals can also be video signals.
3. The door station system according to any one of the preceding aspects, wherein the interior module is further comprises a display screen.
4. The door station system according to any one of the preceding aspects, wherein the interior module further comprises a keypad that is a touch screen or a keyboard with at least one button
5. The door station system according to any one of the preceding aspects, wherein the interior module further comprises a speaker
6. The door station system according to any one of the preceding aspects, wherein the interior module further comprises a voice recognition module.
7. The door station system according to any one of the preceding aspects, wherein the interior module further comprises an audio signal recognition module, e.g. DTMF tones to open/unlock the door.
8. The door station system according to aspect 2 and, optionally, according to any further one of the preceding aspects, wherein the interior module further comprises a face recognition module.
9. The door station system according to aspect 2 and, optionally, according to any further one of the preceding aspects, wherein the interior module further comprises a QR-Code or Barcode recognition module.
10. The door station system according to any one of the preceding aspects, wherein the system further comprises remote peripheral devices selected from the group consisting of smartphones, tablets, computers, IP phones, smart-home devices and other digital communication devices.
11. The door station system according to aspect 10 and, optionally, according to any further one of the preceding aspects, wherein the microphone and speaker can be remotely actuated and two-way communication can be performed.

12. The door station system according to aspect 10 and, optionally, according to any further one of the preceding aspects, wherein a door or gate opener or lock can be remotely actuated.

13. The door station system according to aspect 2 and, optionally, according to any further one of the preceding aspects, wherein the system further comprises remote peripheral devices selected from the group consisting of smartphones, tablets, computers, IP phones, smart-home devices and other digital communication devices.

14. The door station system according to aspect 13 and, optionally, according to any further one of the preceding aspects, wherein the microphone, speaker and video camera can be remotely actuated, two-way communication can be performed and streaming video can be viewed.

15. The door station system according to aspect 13 and, optionally, according to any further one of the preceding aspects, wherein a door or gate opener or lock can be remotely actuated.

16. The door station system according to any one of the preceding aspects, wherein time profiles can be defined within the interior devices, to open/unlock a door automatically upon the press of the keypad.

17. The door station system according to claim 2 wherein time profiles can be defined within the interior devices, to open/unlock a door automatically upon the press of the keypad.

18. The door station system according to any one of the preceding aspects, wherein a voice message can be defined in the interior module to automatically play on the exterior device upon the press of the keypad.

19. The door station system according to aspect 2 and, optionally, according to any further one of the preceding aspects, wherein a voice message can be defined in the interior module to automatically play on the exterior device upon the press of the keypad.

20. The door station system according to any one of the preceding aspects, wherein a voice message can be recorded in the interior module upon the press of the keypad.

21. The door station system according to any one of the preceding aspects, wherein a voice message can be recorded in the interior module upon the press of the keypad.

22. The door station system according to any one of the preceding aspects, wherein the system further comprises at least one remote server on the Internet, e.g. for secure remote access and remote control.

23. The door station system according to aspect 2 and, optionally, according to any further one of the preceding aspects, wherein the system further comprises at least one remote server on the Internet, e.g. for secure remote access and remote control.

24. The door station system according to any one of the preceding aspects, wherein the system further comprises at least one Bluetooth, Zigbee and/or Z-Wave receiver and transmitter, e.g. for secure control of Bluetooth, Zigbee and/or Z-Wave based sensors and locks.

25. The door station system according to aspect 2 and, optionally, according to any further one of the preceding aspects, wherein the system further comprises at least one Bluetooth, Zigbee and/or Z-Wave receiver and transmitter, e.g. for secure control of Bluetooth, Zigbee and/or Z-Wave based sensors and locks.

26. The door station system according to any one of the preceding aspects, wherein the system further comprises at least one remote server on the Internet, e.g. to connect it to a home-care, elderly-care or delivery service, home rental service, or security service solution for remote control.

27. The door station system according to aspect 2 and, optionally, according to any further one of the preceding aspects, wherein the system further comprises at least one remote server on the Internet, e.g. to connect it to a home-care, elderly-care or delivery service, home rental service, or security service solution for remote control.

28. The door station system according to any one of the preceding aspects, wherein the connection interface (CI1) of the communications module (e.g. converter module) can also be connected to an existing indoor station by means of wiring the connection interface (CI1) to the jack of the indoor station which takes the wires coming from the door station.

29. The door station system according to aspect 2 and, optionally, according to any further one of the preceding aspects, wherein the connection interface (CI1) of the communications module (e.g. converter module) can also be connected to an existing indoor station by means of wiring the connection interface (CI1) to the jack of the indoor station which takes the wires coming from the door station.

30. The door station system according to any one of the preceding aspects, wherein the connection interface (CI1) of the communications module (e.g. converter module) can also be connected to an existing indoor station by means of wiring the connection interface (CI1) to a jack of the indoor station which is defined by the engineer of the indoor station to connect peripheral devices.

31. The door station system according to aspect 2 and, optionally, according to any further one of the preceding aspects, wherein the connection interface (CI1) of the communications module (e.g. converter module) can also be connected to an existing indoor station by means of wiring the connection interface (CI1) to a jack of the indoor station which is defined by the engineer of the indoor station to connect peripheral devices.

The invention claimed is:

1. A communications module for a door station, comprising:
a connection interface for communications with at least one door station in accordance with a door station communication protocol, wherein the connection interface comprises a signal generator circuit with at least one adjustable electrical or electronic component providing at least one adjustable signal output range of the generator circuit, the adjustable signal output range being adjustable to cover at least one of the following maximal output ranges: a voltage range of 0 to 60 Volts; a current output range of 0 to 5 Ampere; a power output range of 0 to 5 watts of bower; and an output signal frequency range of 50 Hz to 100 MHz;
a network interface for communications via a network in accordance with a network communication protocol; and
a controller coupling the network interface and the connection interface, wherein the controller is configured to set or change the door station communications protocol of the connection interface.

2. The communication module of claim 1, wherein the network interface is configured for communications according to one or more of: Internet Protocol (IP), Bluetooth, Zigbee, or Z-Wave.

3. The communication module of claim 1, wherein the connection interface is configured for communications with the at least one door station using a non-IP based digital or analog door station communication protocol.

4. The communication module of claim 1, wherein the door station communication protocol enables audio and/or video communication.

5. The communication module of claim 1, further comprising a memory storing a plurality of door station communication protocols, wherein the controller is coupled to the memory and configured to select one of the plurality of door station communication protocols stored in the memory and to set or change the door station communications protocol used by the connection interface in accordance with the selected door station communication protocol.

6. The communication module of claim 1, wherein the at least one adjustable electrical or electronic component of the signal generator circuit is selected from the group consisting of: adjustable Zener diodes, adjustable resistors, adjustable voltage sources, and/or adjustable current sources.

7. The communication module of claim 1, wherein the controller is configured to set or change the door station communications protocol of the connection interface based on a user input received via the network interface.

8. The communication module of claim 1, wherein the network interface is configured for communications with one or more networked devices selected from a group comprising: smartphones, tablets, computers, smart appliances, SIP-based telephones, smart home controllers and control panels.

9. A communications module for a door station, comprising:
a connection interface for communications with at least one door station in accordance with a door station communication protocol, wherein the connection interface comprises a signal generator circuit with at least one adjustable electrical or electronic component providing at least one adjustable signal output range of the generator circuit;
a network interface for communications via a network in accordance with a network communication protocol, and
a controller coupling the network interface and the connection interface, wherein the controller is configured to set or change the door station communications protocol of the connection interface,
wherein, when setting the door station communication protocol of the connection interface, the controller is configured to set or change a working point and/or an adjustable output range of the at least one adjustable electrical or electronic component.

10. A communications module for a door station, comprising:
a connection interface for communications with at least one door station in accordance with a door station communication protocol, wherein the connection interface comprises a signal analyzer circuit configured to determine signaling characterizations on the basis of signals received from the at least one door station and the connection interface is configured to transmit corresponding signal characterizing information to the controller of the communications module;
a network interface for communications via a network in accordance with a network communication protocol; and
a controller coupling the network interface and the connection interface, wherein the controller is configured to set or change the door station communications protocol of the connection interface based on the signal characterizing information.

11. The communication module of claim 10, wherein the signal analyzer circuit is configured, when determining the signaling characterizations, to determine one or more of: characteristic voltage types, characteristic voltage levels, characteristic signaling voltage levels, characteristic voltage level changes, AC voltage frequencies or frequency ranges, the presence of a plurality of frequencies, and the presence of DTMF tones.

12. The communication module of claim 10, wherein the signal analyzer circuit comprises: an adjustable comparator, an analog/digital converter or a signal analysis unit.

13. A door station system, comprising:
at least one door station; and
a communications module for the at least one door station, the communications module comprising:
a connection interface for communications with at least one door station in accordance with a door station communication protocol, wherein the connection interface comprises a signal generator circuit with at least one adjustable electrical or electronic component providing at least one adjustable signal output range of the generator circuit, the adjustable signal output range being adjustable to cover at least one of the following maximal output ranges: a voltage range of 0 to 60 Volts; a current output range of 0 to 5 Ampere; a power output range of 0 to 5 watts of power; and an output signal frequency range of 50 Hz to 100 MHz;
a network interface for communications via a network in accordance with a network communication protocol; and
a controller coupling the network interface and the connection interface, wherein the controller is configured to set or change the door station communications protocol of the connection interface.

14. The door station system of claim 13, comprising at least one wired or wireless communications interface enabling communications between the connection interface of the communication module with at least one connection interface of the at least one door station of the door station system, wherein the communications interface includes at least one of a single communications bus, a central hub or a chained configuration.

15. A method of operating a communications module of a door station, comprising the steps of:
transmitting signals between a connection interface of the communications module and at least one door station using a door station communication protocol, the connection interface comprising a signal generator circuit with at least one adjustable electrical or electronic component providing at least one adjustable signal output range of the generator circuit, the adjustable signal output range being adjustable to cover at least one of the following maximal output ranges: a voltage range of 0 to 60 Volts; a current output range of 0 to 5

Ampere; a power output range of 0 to 5 watts of power; and an output signal frequency range of 50 Hz to 100 MHz;

transmitting signals between a network interface of the communication module with at least one networked device using a network communication protocol;

transmitting signals between the network interface and the connection interface via a controller of the communications module; and setting or changing the door station communication protocol of the connection interface using the controller of the communications module.

16. A method of operating a communications module of a door station, comprising the steps of:

transmitting signals between a connection interface of the communications module and at least one door station using a door station communication protocol, wherein the connection interface comprises a signal generator circuit with at least one adjustable electrical or electronic component providing at least one adjustable signal output range of the generator circuit;

transmitting signals between a network interface of the communication module with at least one networked device using a network communication protocol;

transmitting signals between the network interface and the connection interface via a controller of the communications module; and setting or changing the door station communication protocol of the connection interface using the controller of the communications module to set or change a working point and/or an adjustable output range of the at least one adjustable electrical or electronic component.

17. A method of operating a communications module of a door station, comprising the steps of:

transmitting signals between a connection interface of the communications module and at least one door station using a door station communication protocol, wherein the connection interface comprises a signal analyzer circuit configured to determine signaling characterizations on the basis of signals received from the at least one door station, and the connection interface is configured to transmit corresponding signal characterizing information to a controller of the communications module;

transmitting signals between a network interface of the communication module with at least one networked device using a network communication protocol;

transmitting signals between the network interface and the connection interface via the controller of the communications module; and setting or changing the door station communication protocol of the connection interface using the controller of the communications module based on the signal characterizing information.

18. A door station system, comprising:

at least one door station; and a communications module for the at least one door station, the communications module comprising:

a connection interface for communications with at least one door station in accordance with a door station communication protocol, comprising a signal generator circuit with at least one adjustable electrical or electronic component providing at least one adjustable signal output range of the generator circuit;

a network interface for communications via a network in accordance with a network communication protocol; and a controller coupling the network interface and the connection interface, wherein the controller is configured to set or change the door station communications protocol of the connection interface by setting or changing a working point and/or adjustable output range of the at least one adjustable electrical or electronic component.

19. A door station system, comprising:

at least one door station; and a communications module for the at least one door station, the communications module comprising:

a connection interface for communications with at least one door station in accordance with a door station communication protocol, comprising a signal analyzer circuit configured to determine signaling characterizations on the basis of signals received from the at least one door station, the connection interface being configured to transmit corresponding signal characterizing information to a controller of the communications module;

a network interface for communications via a network in accordance with a network communication protocol; and the controller coupling the network interface and the connection interface, wherein the controller is configured to set or change the door station communications protocol of the connection interface based on the signal characterizing information.

* * * * *